E. Kellogg.
Wool and Cotton Picker.
N°. 8,634.   Patented Jan. 6, 1852.
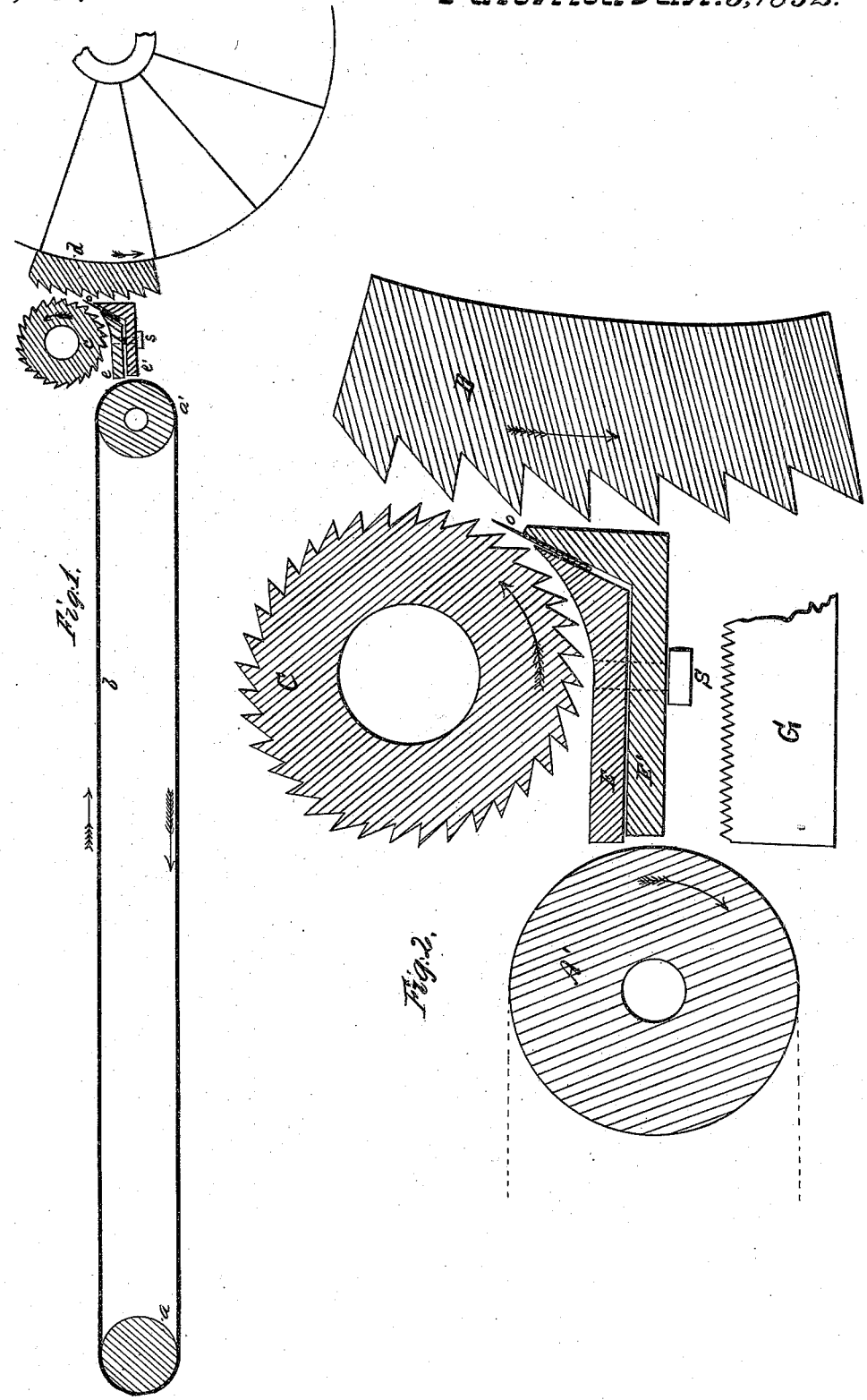

UNITED STATES PATENT OFFICE.

EDWARD KELLOGG, OF NEW HARTFORD, CONNECTICUT.

WOOL-PICKING MACHINE.

Specification of Letters Patent No. 8,634, dated January 6, 1852.

*To all whom it may concern:*

Be it known that I, EDWARD KELLOGG, of New Hartford, in the county of Litchfield and State of Connecticut, have invented a new and useful improvement in the "shell for picking-machines for wool, cotton, and other fibrous substances, to open, extend, and separate the matted fiber, and prepare it for carding and manufacturing.

The nature of my invention consists in attaching a comb to the upper edge of the "shell" (so called) of the "shell and ratchet pickers" heretofore used, and it is applicable and adapted to any of the several forms of that kind of pickers; and especially the "hard-waste" picker for which a patent was granted to myself, and to me in trust, as administrator for the heirs at law of George C. Kellogg, deceased, dated March 28th, 1848. And the nature of the improvement made by the attachment of a comb to the shell at the line between the surface of the feeder, and the main picking or spur cylinder and very near to both of them is that the very small locks and shreds, and even threads and knots, are more perfectly holden,—and holden nearer to their last ends,—than they can be between the feed roller, and a smooth edge of a shell,—while the teeth or spikes (of whichever sort they may be)—of the main picking cylinder are acting upon the fiber to open and disentangle it.

To enable others skilled in cotton and woolen machinery to make and use my invention, I will proceed to describe it fully and exactly, together with its connection with the parts of picking machines now in use, reference being had to the sectional drawings hereto annexed and forming a port of this specification.

In Figure 1, $a, a'$, represent a transverse section of the cloth-rollers belonging to the feeding-table, with $b$,—the feeding apron, or creeper-cloth upon them, and moved by one of them $a'$.

$c$, is a transverse section of a "ratchet" feeder.

$d$, represents a section of a main picking cylinder, showing one plate of serrated picking teeth.

$e, e$, in Fig. 1 represent sections of two straight bars long enough to extend across the feeding table, usually made of cast iron, and of the form shown in the transverse section as represented and well fitted together, with flat faces, and holden together, with from four to seven screw-pins, represented by $s$, and forming together a kind of clamps, to hold firmly and straight, the steel comb-plate between their flanches, or rising edges,—so that the plane of the plate forms nearly a tangent with the cylindric surface of the feeder $c$,—but forms a chord with the circular surface of the picking cylinder as further explained in Fig. 2.

Fig. 2, shows the same parts, marked with the same letters (in capitals)—on a scale of full working dimensions.

G, represents a piece of the steel comb-plate which is holden in the clamps, and constitutes the upper, and working edge of the compound, or combined shell, over which the picking is done between C, and D. This comb plate is like one kind of "doffing combs" used on carding machines, and commonly known as the "conical" or "dagger-tooth" plate:—but it is necessarily too frail to resist the violent action of the picking cylinder, and is liable frequently to be broken, by hard substances fed in, or other casualties;—and in order to replace it easily, it is a considerable improvement to hold it in clamps; though I have used it fastened to a suitable form of shell by small screws or rivets.

It should be observed, that there are some benefits to be obtained by the form, arrangement, and relative position of the comb, the forward part of the shell, and the picking cylinder, so that its circumference, or the points of the picking teeth may approach a little nearer to the points of the comb-teeth, than to the gums or roots of them, and the naked plate below; and so leaving a small recess, in a line below the teeth, into which the small locks, knots, threads &c may recede a little, while they are still holden by the comb-teeth, and more lightly, and yet repeatedly operated upon by the picking teeth, to open and disentangle them more gradually,—rather than to rend, or cut through them by fewer and more violent strokes. And below this small recess, which is represented at $o$, the forward edge of the compound shell is so formed and set as to cause the fiber to re-approach the picking teeth, and still be holden by the comb, if "the staple" is of sufficient length. And by attaching my improved shell, and its combined parts as herein described, or their equivalents substantially the same to picking machines of such kinds as are already in use, the picking is more perfectly performed,—and without unnecessarily shortening, cutting, or chafing the staple or fiber, than it has been done by any other means heretofore used.

I do not claim any improvement in the feeding-table,—ratchet feed-roller,—main picking cylinder,—or any separate parts of the above described machinery.

What I do claim as new, and as my invention, is—

1. The application and use of the comb-plate to the upper and forward edge of the shell, when combined with the compound shell to hold the comb-plate as above described, the several parts thereof being combined for the purpose aforesaid.

2. Also I claim the small recess just below the upper edge of the shell, for the purposes described and set forth.

EDWARD KELLOGG.

Witnesses:
LUTHER SHEPARD,
FREEMAN GRAHAM.